UNITED STATES PATENT OFFICE 2,485,633

SOYBEAN OIL COMPOSITION AND METHOD OF PREPARING SAME

Chester M. Gooding, Staten Island, N. Y., and Hans W. Vahlteich, Edgewater, and Ralph H. Neal, Jersey City, N. J., assignors to The Best Foods, Inc., New York, N. Y., a corporation of New Jersey No Drawing. Application August 1, 1945, Serial No. 608,380

17 Claims. (Cl. 99—163)

This invention relates to soya bean oil compositions, and more particularly to soya bean oil compositions possessing marked resistance to deterioration.

An object of this invention is to retard the deterioration of soya bean oil.

Another object of this invention is to retard for relatively prolonged periods the development of rancidity of soya bean oil.

Another object of this invention is to incorporate agents in soya bean oil, which agents markedly retard deterioration of soya bean oil, but due to their insolubility or immiscibility per se in soya bean oil, are difficult to incorporate therein.

Another object of this invention is to retard the development of off-flavor or flavor reversion in deodorized soya bean oil.

It is well recognized that natural oils and fats develop rancidity particularly in the presence of moisture. This rancidity renders their use, especially for edible products, undesirable and, in some cases, entirely unsatisfactory. Various materials have been heretofore proposed for retarding this development of rancidity in natural oils and fats, but frequently these materials are substantially incompatible with oils and fats, and in some cases their efficacy is questionable.

In deodorized soya bean oil, there sometimes develops an off-flavor which is ordinarily called flavor reversion. This off-flavor has been characterized as grassy, beany, painty or fishy and is somewhat analogous to the original unpalatable taste and odor of the crude oil. This development of off-flavor appears to be different from the rancidity of the oil and is usually discernible before the rancidity becomes manifest quantitatively.

In accordance with this invention, compositions comprising principally soya bean oil or a mixture of oils containing soya bean oil are produced which do not develop rancidity over a relatively long period. These compositions comprise the soya bean oil and a monoester of citric acid, for example a monoaliphatic ester of citric acid, such as a monoalkyl or a monoalkylene ester of citric acid. In some cases, the monoester of citric acid is not soluble or miscible to a sufficient degree in the soya bean oil to produce a substantially homogeneous composition. To disperse the monoester of citric acid throughout the soya bean oil, an oil-soluble hydrophilic coupling agent is employed. Examples of satisfactory oil-soluble hydrophilic coupling agents for this purpose are the diesters and triesters of citric acid, the oil-soluble aliphatic alcohols having at least 6 carbon atoms, monocarboxylic acids having at least 10 carbon atoms and monoglycerides of monocarboxylic acids in which the acyl group has at least 10 carbon atoms. When an oil-soluble hydrophilic coupling agent is employed, the monoester of citric acid is first dissolved in the oil-soluble hydrophilic coupling agent, and the resulting mixture is incorporated in the soya bean oil. The diesters and triesters of citric acid have been found very satisfactory for solubilizing the monoester of citric acid. The incorporation in soya bean oil, and particularly in refined, hydrogenated and deodorized soya bean oil, of a mixture of monoesters and diesters of citric acid or a mixture of monoesters, diesters and triesters of citric acid, has been found effective for preventing the development of the off-flavor.

The compositions of this invention may be a substantially all oil system, such as shortening, or a water and oil system, such as margarine. In the water and oil system, the nicety of balance between the hydrophilic components and lipophilic components may be achieved by regulating the proportions of the monoester of citiric acid and the hydrophilic coupling agent added to soya bean oil. In the oil system, by adding a sufficient quantity such as 0.1 to 10% of monoesters of citric acid and a suitable quantity of the hydrophilic coupling agent, a shortening, for example, is obtained which, when utilized as a component in baking, has a high lift characteristic, permits a high ratio of sugar to flour and produces a resulting baked product which is substantially homogeneous and has a fine texture. In addition, such shortening markedly facilitates the mixing of the water phase components, such as milk, of the batter, and the resulting batter is materially less viscous than batter prepared from low ratio shortening. Monoesters of citric acid alone or in combination with a hydrophilic coupling agent such as monoglycerides of monocarboxylic acids or a maxture of di- and triesters of citric acid or both have been found to have marked emulsifying characteristics.

The ability of the compositions of this invention to withstand deterioration resulting from oxidation is best demonstrated by a comparative testing under identical conditions by the active oxygen test, also called the Swift stability test. In this comparative testing, hydrogenated and deodorized vegetable oil containing between 35 to 40% of hydrogenated and deodorized soya bean oil together with hydrogenated and deodorized cotton seed and peanut oils and having an iodine number (Wijs) from 73 to 75, was subjected to aeration at a temperature of about 100° C. for a period of hours until the rancid point was reached in accordance with the method described in Oil and Soap (vol. X, No. 6, pp. 105–9, June 1933). Samples of the same oil to which was added monostearyl citrate and other samples to which distearyl citrate was added were tested under identical conditions. The results of this testing were as follows:

| Sample | Active Oxygen test Value, Hours to Rancid Point [1] |
|---|---|
| Control (1) (oil without any additions) | 53 |
| Control (2) (oil without any additions) | 51 |
| Control+0.025% Monostearyl citrate (1) | 76 |
| Control+0.025% Monostearyl citrate (2) | 76 |
| Control+0.04% Distearyl citrate (1) | 48 |
| Control+0.04% Distearyl citrate (2) | 53 |

[1] 100-peroxide number—milliequivalents per kilogram.

It is observed that while the vegetable oil to which the distearyl citrate was added had approximately the same value as the samples to which no ester was added, the two samples to which .025% of monostearyl citrate was added had a value which was approximately 50% greater than the oil to which no ester was added.

Another example of the retarding of the development of rancidity with compositions containing soya bean oil as a major ingredient is shown by a comparison of the efficacy of the addition of a lower alkyl monoester of citric acid to a soya bean oil with the addition of the corresponding di- and triesters to the same oil. In this comparison, hydrogenated and deodorized vegetable oil suitable for use in margarine and containing between 35 and 40% of hydrogenated and deodorized soya bean oil together with hydrogenated and deodorized cottonseed and peanut oils, and having an iodine number (Wijs) from 73 to 75 was subjected to the active oxygen test in accordance with the procedure described in Oil and Soap, supra. Simultaneously and under identical conditions, three compositions were tested consisting of the same oil and monoisopropyl citrate, diisopropyl citrate or triisopropyl citrate. The results of this testing were as follows:

| Identity of Sample | Percent by weight of ester in the oil tested | Wiley M. P. of treated oil °F. | Setting Point of Oil °C. | Active Oxygen test, value Hours to rancid point [1] |
|---|---|---|---|---|
| Oil+monoisopropyl citrate | 0.036 | 91.9 | 25.4 | 95 |
|  | 0.018 | 91.9 | 25.1 | 98 |
| Oil+diisopropyl citrate | 0.04 | 91.9 | 25.2 | 64 |
|  | 0.04 | 92.1 | 25.4 | 64 |
| Oil+triisopropyl citrate | 0.05 | 91.4 | 25.5 | 63 |
| Control-oil without any addition | None | 91.9 | 25.2 | 54 |

[1] 100-peroxide number—milliequivalents per kilogram.

Again, the addition of diesters did not materially affect the development of rancidity. Likewise, the addition of triisopropyl citrate produced substantially the same effect as the diisopropyl citrate, while the monoisopropyl citrate materially increased the ability of the oil to withstand oxidation under the conditions of the test.

Another series of tests showing the comparative efficacy of the mono-, di- and triesters of citric acid again illustrates the marked effect that the monoesters have on the prevention of rancidity. In this testing, a hydrogenated and deodorized vegetable oil containing 35 to 40% of soya bean oil, together with hydrogenated and deodorized cottonseed and peanut oils and having an iodine number (Wijs) from 73 to 75 was subjected to aeration under a relatively high temperature as described in Oil and Soap, supra. Other samples containing various amounts of monostearyl citrate, distearyl citrate, tristearyl citrate, monoisopropyl citrate and diisopropyl citrate were tested under identical conditions. The results of these testings are given in the following table:

| Sample | Concentration (Weight Per cent of ester in oil tested) | Active Oxygen test value Hours to Rancid Point [1] |
|---|---|---|
| Oil (without any addition) | None | 54 |
| Oil + Distearyl citrate | 0.025 | 55 |
|  | 0.0125 | 56 |
|  | 0.0063 | 56 |
|  | 0.0032 | 56 |
| Oil + Monostearyl citrate | 0.025 | 94 |
|  | 0.0125 | 85 |
|  | 0.0063 | 76 |
|  | 0.0032 | 75 |
| Oil + Tristearyl citrate | 0.025 | 54 |
|  | 0.0125 | 54 |
| Oil + Monoisopropyl citrate | 0.0125 | 85 |
|  | 0.0063 | 80 |
|  | 0.0032 | 81 |
|  | 0.0016 | 79 |
| Oil + Diisopropyl citrate | 0.0125 | 54 |
|  | 0.0063 | 54 |
|  | 0.0032 | 55 |
|  | 0.0016 | 55 |

[1] 100-peroxide number—milliequivalents per kilogram.

An examination of this table reveals that even a minute quantity of the monoesters retards substantially the development of rancidity in the oil. For example, .0016% by weight of monoisopropyl citrate increases the rancidity number nearly 50%. On the other hand, neither of the dialkyl citrates nor the trialkyl citrate materially retards the development of rancidity under the conditions of test.

The addition of the monoesters of citric acid retards the development of rancidity due to oxidation in all types of soya bean oil although the most pronounced effect is observed with deodorized soya bean oil, such as hydrogenated and deodorized soya bean oil employed for margarine and shortening. An illustration of the improvement in compositions of this invention over hydrogenated but undeodorized soya bean oil to which no monoester is added is shown in the following table in which hydrogenated but undeodorized soya bean oil is compared under indentical conditions in accordance with the active oxygen test with hydrogenated but undeodorized soya bean oil to which monostearyl citrate or distearyl citrate was added.

| Composition | Iodine Number | Hours to End Point (End Point 100 Peroxide number) |
|---|---|---|
| Hydrogenated, undeodorized soya bean oil (without any addition) | 79.1 / 79.1 | 234 / 237 |
| Hydrogenated, undeodorized soya bean oil (without any addition)+0.025% Monostearyl citrate | 79.1 / 79.1 | 368 / 365 |
| Hydrogenated, undeodorized soya bean oil (without any addition)+0.04% Distearyl citrate | 79.1 / 79.1 | 240 / 237 |

Although the values given in the data outlined in the above tables are believed to be typical and representative of soya bean oils, variations will appear among soya bean oils, particularly those derived from different origins. In some of these oils the improvement by the addition of the monoester is more marked than in others. A particular improvement is found in soya bean oil hydrogenated to a degree required for use as a component of margarine or shortening. However, all soya bean oils are improved to at least some degree.

The prevention of rancidity as manifest by the values obtained in active oxygen tests is applicable to soya bean oil or mixtures of soya bean oil with other vegetable oils such as cottonseed oil and peanut oil as heretofore shown. For example, in the production of margarine, soya bean oil is sometimes employed in significant amounts such as from about 25 to 75% in a blend of oils for this purpose. The addition of the monoesters of citric acid to such mixtures of vegetable oils has been found to retard the development of rancidity of the oils particularly after they have been hydrogenated and deodorized. Some of the monoesters of citric acid are soluble only to a limited degree in soya bean oil or mixtures containing soya bean oil. This is particularly true of the monoalkyl esters of citric acid in which the alkyl group has less than 10 carbon atoms. While the oil may be heated to dissolve some of these monoesters, such heating, particularly if a high temperature is required, materially damages the oil for some purposes. To facilitate the uniform dispersion of the monoesters throughout the body of the oil, an oil-soluble coupling agent is employed. The monoester is dissolved in the coupling agent and the resulting solution mixed, desirably with agitation, throughout the body of the oil. Among the coupling agents that are satisfactory for this purpose are monoacyl glycerides, preferably monoacyl glycerides in which the acyl radical has at least 10 carbon atoms, saturated monohydric alcohols, preferably saturated monohydric alcohols having at least 6 carbon atoms, fatty acids having at least 10 carbon atoms, diesters of citric acid such as dialiphatic esters of citric acid, for example, dialkyl citrates in which the alkyl group has at least 10 carbon atoms and triesters of citric acid such as trialiphatic esters of citric acid, for example, trialkyl citrate in which the alkyl group has at least 10 carbon atoms.

Examples of monoacyl glycerides which may be employed as coupling agents are the monostearyl glycerides, monooleyl glycerides, monolauryl glycerides and monopalmityl glycerides or mixtures thereof. These monoacyl glycerides as commercially prepared contain substantial amounts of the corresponding diacyl glycerides and traces of the corresponding triacyl glycerides. Such monoacyl glycerides as commercially prepared may be employed as the coupling agents in the compositions of this invention.

Examples of saturated monohydric alcohols which may be employed as coupling agents are 2-ethylhexyl alcohol, n-octyl alcohol, stearyl alcohol, cetyl alcohol and myristyl alcohol.

Examples of the fatty acids which may be employed as solubilizing agents are stearic acid, palmitic acid, oleic acid, lauric acid and myristic acid.

Examples of the monoesters which may be employed in the compositions of this invention are ethyl citrate, n-propyl citrate, isopropyl citrate, n-butyl citrate, crotyl citrate, isobutyl citrate, isoamyl citrate, 2-ethylhexyl citrate, lauryl citrate, myristyl citrate, palmityl citrate, oleyl citrate and stearyl citrate.

Examples of the dialiphatic esters of citric acid such as dialkyl esters of citric acid and dialkylene esters of citric acid which may be employed as solubilizing or coupling agents for the monoaliphatic esters of citric acid are the dialiphatic cittric acid esters corresponding to the monoaliphatic citric acid esters heretofore listed. Likewise, examples of the trialiphatic esters of citric acid which may be employed as coupling agents are those corresponding to the monoaliphatic esters of citric acid heretofore specifically noted.

Mixtures of the monoaliphatic esters of citric acid may be employed in the composition of this invention. For example, a mixture of different monoalkyl esters of citric acid may be added to the soya bean oil, or again, different monoalkylene monoesters of citric acid may be added to the soya bean oil; or a mixture of a monoalkyl ester and a monoalkylene ester may be employed. Likewise, mixtures of dialiphatic esters of citric acid or the trialiphatic esters of citric acid may be utilized as solubilizing agents. In fact, it has been found convenient to produce the solubilizing agent simultaneously with the monoaliphatic esters of citric acid. This end can be conveniently achieved by reacting an appropriate amount of citric acid with an aliphatic alcohol such as an alkyl or alkylene alcohol to produce the required amount of the monoaliphatic esters of citric acid together with sufficient amounts of the corresponding di- and/or triesters of citric acid to effect solubilizing of the monoesters in the soya bean oil.

Again mixtures of various solubilizing agents may be utilized to effect uniform dispersion of the monoaliphatic esters of citric acid throughout the soya bean oil. For example, a mixture of lauryl alcohol, cetyl alcohol, distearyl citrate and tristearyl citrate may be employed to effect the solubilizing of monoisopropyl citrate in the soya bean oil. Alternately, a mixture of different monoacyl glycerides may be utilized for solubilizing the monoester.

The monoesters used in the composition of this invention are new compounds and are prepared by the esterification of citric acid and a monohydric alcohol preferably in proportions which favor the formation of the monoesters. The esterification may be conducted by any of the well known methods employed for the production of esters, and the resulting reaction mixture which comprises not only the monoesters of citric acid but small amounts of di- and triesters of citric acid is subjected to treatment with solvents which dissolve the monoesters but do not dissolve any appreciable amounts of the di- and triesters, or alternately solvents which dissolve the di- and triesters but do not dissolve appreciable quantities of the monoesters. By repeating the treatment with these solvents, a relatively pure monoester of citric acid may be obtained. For example, a monohydric primary alkyl alcohol may be reacted with anhydrous citric acid dissolved in a solvent such as dry pyridine. The amounts of citric acid and alcohol employed are desirably those which favor the formation of the monoester. For this purpose, an amount of citric acid in excess of that required to react with the alcohol to produce the monoester is employed. The reaction mixture is heated for a period of from 4 to 6 hours at about 100° C., after which the reaction mixture is maintained for a period of from 14 to 20 hours at about 40 to 50° C. The resulting reaction product is then poured into a water-ice mixture containing a sufficient quantity of concentrated sulfuric acid to react with the pyridine in the mixture to form pyridine sulfate. A solvent such as a low boiling petroleum ether in which the di- and triesters are relatively soluble, but in which the monoester is relatively insoluble, is employed to effect a separation of the monoester from the small amounts of the di- and triesters in the reaction mixture. The aqueous mixture is extracted first with ethyl ether in which the monoester as well as the di- and triester is relatively soluble. To this ethyl ether extract is added a relatively large quantity of low boiling petroleum ether in which the monoester is substantially insoluble, but in which the di- and triesters are relatively soluble. This precipitates the monoester. If further purification is desired, this precipitate or oily residue is again dissolved in ethyl ether, and the procedure repeated. Some of the di- and triesters employed as coupling agents are also new, and these di- and triesters are produced by reacting citric acid and the required alcohol in amounts which favor the formation of either the di- or triesters. The di- and triesters may be separated from each other and from any monoester contained therein by fractional crystallization with a suitable solvent such as ethyl alcohol.

A more comprehensive understanding of this invention is obtained by reference to the following examples:

Example 1.—Composition containing monostearyl citrate

To 100 grams of refined, hydrogenated and deodorized soya bean oil is added .025 gram of monostearyl citrate. The mixture is preferably heated to approximately 80° C. to effect the relative uniform dispersion of the monostearyl citrate throughout the soya bean oil.

The monostearyl citrate is a new compound and is prepared as follows:

120 grams of anhydrous citric acid are dissolved in 200 grams of refined, dry pyridine containing 1.8 grams of concentrated sulphuric acid by mechanical agitation while heating on a steam plate at about 95° C. 20 grams of pure stearyl alcohol are then introduced. The stearyl alcohol is quite insoluble in the reaction mixture, a condition favoring monoester formation since a small concentration of stearyl alcohol in solution is reacted with a large excess of citric acid. The reaction mixture becomes homogeneous after about 4 hours after which time the reaction mixture is maintained at 40°–50° C. for 16 hours.

The reaction mixture is poured into iced-water containing 75 grams of concentrated sulfuric acid. The aqueous mixture is extracted with ethyl ether and the ether extract is thoroughly washed with dilute hydrochloric acid and then with water and finally dried with anhydrous sodium sulfate. The ethyl ether solution of monostearyl citrate is evaporated, and the residue is crystallized several times from a petroleum ether, the boiling range of which is 80° to 112° C.

A typical melting point of the product is from 74° to 88.5° C., probably depending upon the proportion of symmetrical and unsymmetrical monoesters present. Other typical characteristics are:

|  | Found | Calc'd |
|---|---|---|
| Acid Value | 246 | 253 |
| Saponification Value | 358 | 379 |

Example 2.—Composition containing monoisopropyl citrate

One gram of monoisopropyl citrate is dissolved in 5 grams of monoacyl glycerides prepared from a commercial vegetable oil containing about 60% of hydrogenated and deodorized soya bean oil and the remainder hydrogenated and deodorized cottonseed oil. The monoglycerides are prepared from this vegetable oil by reacting glycerine with the vegetable oil in the presence of sodium bicarbonate. The amount of oil and glycerine added are such as to produce predominantly the monoacyl derivatives of the fatty acid components of the vegetable oil. The solution of the monoisopropyl citrate is added at a temperature of about 100–120° F. to 10 kilograms of a hydrogenated and deodorized vegetable oil suitable for use in the production of margarin and containing about 60% of hydrogenated and deodorized soya bean oil and the remainder hydrogenated and deodorized cottonseed oil. The soya bean oil prior to the addition of the solution of the monoisopropyl citrate is heated to a temperature of 35–50° C. to insure its being in a liquid condition during the addition. The mixture is then agitated to disperse uniformly the monoisopropyl citrate throughout the soya bean oil.

The monoisopropyl citrate is a new compound and is prepared as follows:

Equal parts of USP citric acid and anhydrous isopropyl alcohol are heated together under reflux, without catalyst for 118 hours at 92° C., after which time the acid value of the reaction mixture is found to be about 203.6 and the saponification value 392 (one-half esterified). The alcohol and most of the water of reaction are removed by low temperature evaporation in vacuo.

The residue is taken up with ethylether and then thrown out of the ether solution by the addition of a quantity of low-boiling petroleum ether just sufficient to form a precipitate. The precipitate or oily residue is again taken up with ethyl ether and the precipitation with low boiling petroleum ether repeated. This procedure is repeated several times. After final removal of solvent by heating with stirring to 130° C. a typical analysis is:

|  | Found | Calc'd |
|---|---|---|
| Acid Value | 454 | 480 |
| Saponification Value | 709 | 720 |

This product solidifies after long standing and consists of a mixture of about 90% monoester and 10% diester. The resulting product, without further purification, may be used in the soya bean composition heretofore described.

Example 3.—Composition containing monostearyl citrate

A composition of soya bean oil and monostearyl citrate is conveniently prepared by first producing a mixture of the monostearyl citrate, distearyl citrate and tristearyl citrate and adding the resulting mixture to the soya bean oil. In this way, the distearyl citrate and tristearyl citrate act as solubilizing agents for the monostearyl citrate, and the monostearyl citrate retards markedly the development of rancidity of the soya bean oil. The mixture of monostearyl citrate, distearyl citrate and tristearyl citrate for this purpose is prepared as follows:

12.1 kilos of citric acid monohydrate are added to 30 kilos of commercial stearyl alcohol which is previously melted. During the addition, the mixture is agitated. The mixture is held at 150° C. under reduced pressure for a period of 1½ hours. At the end of this period, boiling and foaming ceases substantially. The resulting product which consists of a mixture of monostearyl citrate, distearyl citrate and tristearyl citrate has an acid value of about 83, a saponification value of about 249.0 and a melting point of about 51–68° C. and a color on the Lovibond scale of about 35Y–5.8R.

Five grams of the mixture of monostearyl citrate, distearyl citrate and tristearyl citrate heated to about 65° C. are added to 10 kilograms of hydrogenated and deodorized soya bean oil maintained at a temperature of about 60° C. During the addition the mixture is agitated.

*Example 4.—Composition containing monooleyl citrate and monostearyl citrate*

A mixture of monooleyl citrate and monostearyl citrate are employed for retarding the rancidity of a vegetable oil containing 50% soya bean oil and suitable for the production of margarin. To disperse better the monostearyl citrate and the monooleyl citrate throughout the body of the vegetable oil containing hydrogenated and deodorized soya bean oil, the monostearyl citrate and the monooleyl citrate are prepared in such a manner as to produce simultaneously their corresponding di- and triesters together with mixed esters of oleyl alcohol and stearyl alcohol. A mixture of mono-, di- and tricitric acid esters derived from stearyl alcohol and oleyl alcohol is prepared by employing proportions of citric acid and oleyl and stearyl alcohol to produce a ratio of mono-, di- and triesters to effect the solubilizing of the monoesters. A ratio found satisfactory for this purpose is 50% monoesters, 20% diesters and 30% triesters.

A mixture of the monostearyl citrate, the monooleyl citrate and the corresponding di- and triesters together with the mixed esters is prepared as follows:

A mixture of 14 kilos of commercial oleyl alcohol and 14 kilos of commercial stearyl alcohol are melted. To this mixture is added 10.2 kilos of anhydrous citric acid. During the addition the mixture is agitated. The mixture is heated and held for a period of 1¼ hours at 150° C. under reduced pressure. At the end of this period boiling and foaming ceases substantially. The mixture contains the monostearyl citrate, monooleyl citrate and their corresponding di- and triesters together with the mixed esters. 2.5 grams of this mixture containing monostearyl citrate, monooleyl citrate and their corresponding di- and triesters together with the mixed esters are melted and added to 10 kilos of a vegetable oil containing about 50% of hydrogenated and deodorized soya bean oil and the remainder hydrogenated and deodorized peanut oil heated to about 50° C. During the addition the mixture is agitated to effect a uniform dispersion of the monoesters throughout the oil.

*Example 5.—Composition containing monoisopropyl citrate*

A composition comprising hydrogenated and deodorized soya bean oil in which is incorporated the monoisopropyl citrate together with the diisopropyl citrate and triisopropyl citrate and the monoglycerides of the fatty acid components of substantially any vegetable oil, but conveniently the fatty acid components of the vegetable oil to which this mixture is added is found particularly satisfactory for margarin oils. The monoisopropyl citrate together with its solubilizing agents consisting of the diisopropyl citrate and triisopropyl citrate and the monoglycerides are preferably mixed with a quantity of the oil being treated to form a homogeneous mixture. As in Examples 3 and 4, since the diisopropyl citrate and triisopropyl citrate are employed as solubilizing agents, these compositions are prepared simultaneously with the monoisopropyl citrate. The mixture of esters is produced as follows:

260 grams of anhydrous citric acid are mixed with 130 grams of commercial isopropyl alcohol, and the mixture is heated at 155° C. for 2 hours in a closed vessel. The pressure developed by the alcohol corresponds to about 55 lbs. per square inch. The alcohol is then evaporated under reduced pressure with a nitrogen stream at 130° C. A typical acid value of the resulting product is 386 and a typical saponification number 702. A typical ratio of free carboxyl to total carboxyl is 0.55.

38 parts of these mixed isopropyl esters of citric acid are dissolved in 44.3 parts of monoglycerides prepared as described in Example 2 together with the 17.7 parts of the hydrogenated and deodorized oil to be treated. Preferably 17.7 parts of the oil to be treated are added to the crude monoglycerides after their preparation and before washing. This procedure aids in separation of the wash water and decreases the degree of spontaneous esterification of the free carboxyl groups of the isopropyl citrates by the free hydroxyl groups of the monoglycerides. The wash, moreover, removes excess glycerin.

10 cc. of the solution of the monoglycerides containing the mixed isopropyl esters are added to 10 kilos of hydrogenated and deodorized vegetable oil containing about 50% soya bean oil and the remainder peanut oil. The oil prior to the addition is heated to a temperature of about 50° C., and during the addition the mixture is agitated.

The procedure outlined in this example has also been found particularly advantageous in the treatment of oil prepared for use as shortening. In that case, 20 cc. of the solution of the mixed isopropyl esters of citric acid are added to 40 kilos of a hydrogenated and deodorized soya bean oil suitable for use as shortening.

*Example 6.—Composition containing monostearyl citrate*

One kilo of monostearyl citrate, one kilo of distearyl citrate and two kilos of tristearyl citrate are heated to a temperature of about 80° C., and this mixture is added to 7,000 kilos of soya bean oil heated to a temperature of about 55° C. The mixture is agitated to effect dispersion of the monostearyl citrate throughout the mixture. The distearyl citrate and the tristearyl citrate employed as solubilizing agents are prepared as follows:

These esters are obtained by fractional crystallization of the mixed stearyl citrate esters described in Example 3. By use of 750 cc. of ethyl alcohol, from 150 grams of mixed esters there is obtained about 21.8 grams of triester from the first three fractions. In a typical run, the 4th, 5th and 6th fractions yield a total of about 49.4 grams of fairly pure diesters. The combined diesters are recrystallized from anhydrous isopropyl alcohol and finally from acetone. The melting point range is about 69°–72° C. When supercooled to 50° C. double melting points are observed at about 53° C. with resolidification and a second melting point of 72° C. The following is a typical analysis:

|  | Found | Calc'd |
|---|---|---|
| Acid Value | 76.4 | 80.6 |
| Saponification Value | 240.2 | 241.8 |

*Example 7.—Composition containing monoisopropyl citrate*

5 parts of mixed isopropyl citrates prepared in accordance with the procedure outlined in Example 5 are dissolved in 20 parts of distilled red oil. 25 cc. of this solution are added to 5 kilos of unhydrogenated and undeodorized soya bean oil. During the addition of the solution of the mixed isopropyl citrates, the mixture is agitated vigorously.

*Example 8.—Composition containing monoisopropyl citrate*

Monoisopropyl citrate may be added to soya bean oil and dispersed uniformly therethrough by the use of the corresponding di- and triesters and stearic acid. A mixture for this purpose may be conveniently prepared as follows:

25 parts of mixed isopropyl esters of citric acid prepared as described in Example 5 are heated with 125 parts of commercial stearic acid to about 120° C., with vigorous stirring in an inert atmosphere for ½ hour. The mixture is substantially homogeneous soon after passing 100° C. and remains so down to the solidification temperature of the stearic acid used as one of the coupling agents.

6 cc. of the solution of the mixed isopropyl esters as heretofore described are added to 10 kilos of hydrogenated and deodorized soya bean oil heated to about 50° C. During the addition, the oil is agitated vigorously.

*Example 9.—Composition containing monoisopropyl citrate*

50 grams of the mixed isopropyl citrates described in Example 5 are dissolved in 50 grams of commercial oleyl alcohol. 2 cc. of this mixture are added with agitation to 10 kilos of unhydrogenated soya bean oil.

*Example 10.—Composition containing monoethyl citrate*

Monoethyl citrate is added to a hydrogenated and deodorized soya bean oil mixed with hydrogenated and deodorized peanut and cottonseed oils. The monoethyl citrate is rendered soluble in the soya bean oil composition by diethyl citrate, triethyl citrate and monoglycerides of the fatty acid components of the oil to which it is added. The monoethyl citrate is preferably prepared simultaneously with the diethyl citrate and triethyl citrate by the method hereinafter described, and the mixture of mono-, di- and triethyl citrate is dissolved in the monoglycerides of the fatty acid components of the oil to which the monoethyl citrate is to be added. 50 grams of the mixture of mono, di- and triethyl citrates are added to 50 grams of the monoglycerides of the fatty acid components of a hydrogenated and deodorized vegetable oil consisting of 35–40% of soya bean oil and the remainder cottonseed and peanut oils and having an iodine number of 73 to 76. The monoglycerides are prepared in the same manner as the monoglycerides in Example 2. The amount of monoethyl citrate in the mixture of mono-, di- and triethyl citrates is about 75%. 1 cc. of the solution of the mixture of ethyl citrates in the monoglycerides is added to 1 kilo of the hydrogenated and deodorized vegetable oil maintained at a temperature of about 50° C. and agitated to effect dispersion of the composition throughout the oil.

The mixture of monoethyl citrate, diethyl citrate and triethyl citrate is prepared as follows: 96 grams of anhydrous citric acid and 300 c. c. of absolute ethanol are refluxed for 3 days. The excess ethanol is removed by evaporation on a steam bath. Analysis of the resulting mixture shows the following acid and saponification values:

Acid value _____ 258.2
Saponification value _____ 680.7

*Example 11.—A composition containing monostearyl citrate*

A composition of hydrogenated and deodorized soya bean oil and monostearyl citrate suitable for use for deep fat frying (or a shortening) and particularly adapted for the frying of potato chips and doughnuts is prepared by adding to hydrogenated and deodorized soya bean oil, a mixture of monstearyl citrate, distearyl citrate and tristearyl citrate in a solution of the monoglycerides of the fatty acid components of the hydrogenated and deodorized soya bean oil to which the mixture is added. The distearyl citrate and tristearyl citrate act as solubilizing agents for the monostearyl citrate and the monoglycerides of the fatty acid components of the soya bean oil also aid in the solubilizing of the monostearyl citrate. Satisfactory results may also be obtained, if desired, without the addition of the monoglycerides. The mixture of monostearyl citrate, distearyl citrate and tristearyl citrate for this purpose is prepared as follows:

To 130 kilos of melted commercial stearyl alcohol are added 105 kilos of USP citric acid, while stirring at a temperature of about 120° C. When the citric acid has entirely melted, reduced pressure is gradually applied while slowly increasing the temperature to 150° C. The reaction period is approximately 1½ hours during which time ebullition gradually subsides as evidence of the completion of the reaction. The product has an acid value of approximately 190 and a saponification value of 350.

The monoglycerides of the fatty acid components of the hydrogenated and deodorized soya bean oil are prepared in the same manner as described in Example 2. 20 cc. of the solution of the mixture of monostearyl citrate, distearyl citrate and tristearyl citrate in monoglycerides are added with agitation to 10 kilos of the hydrogenated and deodorized soya bean oil at a temperature of about 50° C. This resulting composition is particularly adapted for deep fat frying and does not develop the rancidity which is manifest in the same hydrogenated and deodorized soya bean oil to which no monostearyl citrate is added. It has been found that when potato chips are fried in this composition containing monostearyl citrate, and the potato chips stored at 95° F. for a period of about four weeks no undesired taste is manifest in the resulting potato chips, whereas potato chips prepared under identical conditions using the same hydrogenated and deodorized soya bean oil to which no monostearyl citrate was added had an unpalatable taste. This comparative testing was performed by four experts skilled in flavor testing.

What is claimed is:

1. A food product comprising a significant amount of soya bean oil having incorporated therein a monoester of citric acid, the amount of said monoester being not more than 0.1% of said soya bean oil by weight.

2. A food product comprising a significant amount of soya bean oil having incorporated therein a monoalkyl ester of citric acid, the amount of said monoalkyl ester being not more than 0.1% of said soya bean oil by weight.

3. A food product comprising a significant amount of soya bean oil having incorporated therein a monoalkylene ester of citric acid, the amount of said monoalkylene ester being not more than 0.1% of said soya bean oil by weight.

4. A food product comprising a significant amount of hydrogenated and deodorized soya bean oil having incorporated therein a monoalkyl ester of citric acid, the amount of said monoalkyl ester being not more than 0.1% of said soya bean oil by weight.

5. A food product comprising a significant amount of hydrogenated and deodorized soya bean oil having incorporated therein a monoalkylene ester of citric acid, the amount of said monoalkylene ester being not more than 0.1% of said soya bean oil by weight.

6. A food product comprising a significant amount of deodorized soya bean oil having incorporated therein a monoalkyl ester of citric acid and a mutual solvent for said oil and said monoalkyl ester, the amount of said monoalkyl ester being not more than 0.1% of said soya bean oil by weight.

7. A food product comprising a significant amount of hydrogenated and deodorized soya bean oil having incorporated therein a monoalkyl ester of citric acid and a mutual solvent for said oil and said monoalkyl ester, the amount of said monoalkyl ester being not more than 0.1% of said soya bean oil by weight.

8. A food product comprising a significant amount of deodorized soya bean oil having incorporated therein a monoalkylene ester of citric acid and a mutual solvent for said oil and said monoalkylene ester, the amount of said monoalkylene ester being not more than 0.1% of said soya bean oil by weight.

9. A food product comprising a significant amount of hydrogenated and deodorized soya bean oil having incorporated therein a monoester of citric acid and a monoglyceride of a monocarboxylic acid in which the acyl group has at least 10 carbon atoms, the amount of said monoester being not more than 0.1% of said soya bean oil by weight.

10. A food product comprising a significant amount of hydrogenated and deodorized soya bean oil having incorporated therein monostearyl citrate, the amount of said monostearyl citrate being not more than 0.1% of said soya bean oil by weight.

11. A food product comprising a hydrogenated and deodorized soya bean oil having incorporated therein monoethyl citrate, the amount of said monoethyl citrate being not more than 0.1% of said soya bean oil by weight.

12. A food product comprising a significant amount of hydrogenated and deodorized soya bean oil having incorporated therein monooleyl citrate and monostearyl citrate, the amount of said monooleyl citrate and monostearyl citrate being not more than 0.1% of said soya bean oil by weight.

13. A method of retarding the development of rancidity of a food product comprising a significant amount of hydrogenated and deodorized soya bean oil, said method comprising incorporating in said oil a monoaliphatic ester of citric acid, the amount of said monoaliphatic ester incorporated in said oil being not more than 0.1% of said soya bean oil by weight.

14. A method of retarding the development of rancidity of a food product comprising a significant amount of hydrogenated and deodorized soya bean oil, said method comprising incorporating in said oil a monoalkyl ester of citric acid, the amount of said monoalkyl ester incorporated in said oil being not more than 0.1% of said soya bean oil by weight.

15. A method of retarding the development of rancidity of a food product comprising a significant amount of hydrogenated and deodorized soya bean oil, said method comprising incorporating in said oil a monoalkylene ester of citric acid, the amount of said monoalkylene ester incorporated in said oil being not more than 0.1% of said soya bean oil by weight.

16. A method of retarding the development of rancidity of a food product comprising a significant amount of hydrogenated and deodorized soya bean oil, said method comprising incorporating in said oil a monoalkyl ester of citric acid dissolved in a mutual solvent for said monoalkyl ester and said oil, the amount of said monoalkyl ester incorporated in said oil being not more than 0.1% of said soya bean oil by weight.

17. A method of retarding the development of rancidity of a food product comprising a significant amount of a hydrogenated and deodorized soya bean oil, said method comprising incorporating in said oil a monoalkylene ester of citric acid dissolved in a mutual solvent for said monoalkylene ester and said oil, the amount of said monoalkylene ester incorporated in said oil being not more than 0.1% of said soya bean oil by weight.

CHESTER M. GOODING.
HANS W. VAHLTEICH.
RALPH H. NEAL.

REFERENCES CITED

The following references are of record in the file of this patent:

UNITED STATES PATENTS

| Number | Name | Date |
|---|---|---|
| 1,857,274 | Emhardt | May 10, 1932 |
| 2,122,716 | Graves | July 5, 1938 |
| 2,197,269 | Guillandeu | Apr. 16, 1940 |
| 2,377,610 | Brown | June 5, 1945 |